(12) United States Patent
Drost

(10) Patent No.: US 11,796,365 B2
(45) Date of Patent: Oct. 24, 2023

(54) CLEANING AND DETECTING A CLEAN CONDITION OF A VIBRATORY METER

(71) Applicant: MICRO MOTION, INC., Boulder, CO (US)

(72) Inventor: Timothy M. Drost, Erie, CO (US)

(73) Assignee: MICRO MOTION, INC., Boulder, CO (US)

( * ) Notice: Subject to any disclaimer, the term of this patent is extended or adjusted under 35 U.S.C. 154(b) by 298 days.

(21) Appl. No.: 17/274,075

(22) PCT Filed: Oct. 8, 2018

(86) PCT No.: PCT/US2018/054844
§ 371 (c)(1),
(2) Date: Mar. 5, 2021

(87) PCT Pub. No.: WO2020/076284
PCT Pub. Date: Apr. 16, 2020

(65) Prior Publication Data
US 2021/0396566 A1 Dec. 23, 2021

(51) Int. Cl.
| | |
|---|---|
| *G01F 1/84* | (2006.01) |
| *G01F 25/10* | (2022.01) |
| *G01F 15/12* | (2006.01) |
| *G01N 11/16* | (2006.01) |
| *G01N 9/00* | (2006.01) |

(52) U.S. Cl.
CPC ............ *G01F 1/8436* (2013.01); *G01F 15/12* (2013.01); *G01F 25/10* (2022.01); *G01N 11/16* (2013.01); *G01N 2009/006* (2013.01)

(58) Field of Classification Search
None
See application file for complete search history.

(56) References Cited

U.S. PATENT DOCUMENTS 7,865,318 B2 * 1/2011 Rensing ................. G01N 9/002
702/56
2007/0186682 A1 8/2007 Duffill et al.

FOREIGN PATENT DOCUMENTS

JP 2003194610 A 7/2003

* cited by examiner

*Primary Examiner* — Harshad R Patel
(74) *Attorney, Agent, or Firm* — The Ollila Law Group LLC

(57) ABSTRACT

A meter electronics (20) configured to clean a conduit in a vibratory meter (5) is provided. The meter electronics (20) includes an interface (201) configured to provide a drive signal to a meter assembly (10) communicatively coupled to the meter electronics (20) and receive one or more sensor signals from the meter assembly (10), and a processing system (202) communicatively coupled to the interface (201). The processing system (202) is configured to determine a parameter from the one or more received sensor signals. The processing system (202) is further configured to, based on the parameter, at least one of detect an unclean condition of the meter assembly (10) and enter into a cleaning mode, and detect a clean condition of the meter assembly (10) and enter into a non-cleaning mode.

16 Claims, 5 Drawing Sheets

CLEANING AND DETECTING A CLEAN CONDITION OF A VIBRATORY METER

TECHNICAL FIELD

The embodiments described below relate to cleaning a vibratory meter and, more particularly, cleaning and detecting a clean condition of the vibratory meter.

BACKGROUND

Vibrating sensors, such as for example, vibrating densitometers and Coriolis flowmeters are generally known, and are used to measure mass flow and other information for materials flowing through a conduit in the flowmeter. Exemplary Coriolis flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no-flow through the flowmeter, a driving force applied to the conduit(s) causes all points along the conduit(s) to oscillate with identical phase or a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and determine a mass flow rate and other properties of a material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired flow tube amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

However, unclean conditions in the vibratory meter can affect the accuracy of the transducer. For example, a coating in the vibratory meter may cause the time delay between the pickoffs to change. As a result, the properties measured by the flowmeter may be inaccurate. In addition, if the coating is not detected and a cleaning process is not performed, then the inaccurate measurements by the flowmeter may likewise be undetected. Furthermore, when a cleaning process is performed, the flowmeter may be offline, thereby causing downtime in a system in which it is employed. This downtime may be unnecessarily long due to a requirement for manual intervention; such as a user being required to stop the cleaning process. Therefore, there is a need for cleaning and detecting a clean condition in the vibratory meter.

SUMMARY

A meter electronics configured to clean a conduit in a vibratory meter is provided. According to an embodiment, the meter electronics comprises an interface configured to provide a drive signal to a meter assembly communicatively coupled to the meter electronics and receive one or more sensor signals from the meter assembly, and a processing system communicatively coupled to the interface. According to the embodiment, the processing system is configured to determine a parameter from the one or more received sensor signals, and, based on the parameter, at least one of detect an unclean condition of the meter assembly and enter into a cleaning mode, and detect a clean condition of the meter assembly and enter into a non-cleaning mode.

A method of cleaning a conduit in a vibratory meter is provided. According to an embodiment, the method comprises providing a drive signal to a meter assembly, receiving one or more sensor signals from the meter assembly, and determining a parameter of one or more received sensor signals using a processing system. According to the embodiment, the method also includes, based on the parameter, at least one of detecting an unclean condition of the meter assembly and placing the processing system into a cleaning mode, and detecting a clean condition of the meter assembly and placing the processing system into a non-cleaning mode.

ASPECTS

According to an aspect, a meter electronics (20) is configured to clean a conduit in a vibratory meter (5) comprises an interface (201) configured to provide a drive signal to a meter assembly (10) communicatively coupled to the meter electronics (20) and receive one or more sensor signals from the meter assembly (10), and a processing system (202) communicatively coupled to the interface (201). The processing system (202) is configured to determine a parameter from the one or more received sensor signals. The processing system (202) is further configured to, based on the parameter, at least one of detect an unclean condition of the meter assembly (10) and enter into a cleaning mode, and detect a clean condition of the meter assembly (10) and enter into a non-cleaning mode.

Preferably, the processing system (202) is further configured to detect the unclean condition if a value of the parameter substantially deviates from a baseline value of the parameter, and detect the clean condition if the value of the parameter substantially equals the baseline value of the parameter. The baseline value is associated with a previously determined clean condition of the vibratory meter (5).

Preferably, the cleaning mode of the processing system (202) comprises the processing system (202) being configured to execute a cleaning routine. The cleaning routine comprises iteratively and repeatedly determining a value of the parameter of the received one or more pick-off signals, comparing the value of the parameter to a baseline value of the parameter, and detecting the unclean condition based on the comparison.

Preferably, the processing system (202) is further configured to detect the clean condition of the meter assembly (10) while the meter electronics (20) is in the cleaning mode, and, if the clean condition is detected, enter into a non-cleaning mode.

Preferably, the processing system (202) being configured to enter into the cleaning mode comprises the processing system (202) being configured to send a cleaning mode signal over path (26) indicating the cleaning mode of the processing system (202).

Preferably, the drive signal comprises a resonant component and at least one non-resonant component, the one or more sensor signals comprises at least one component, the at least one component corresponding to the at least one non-resonant component of the drive signal, the parameter is determined from the at least one non-resonant component of the drive signal and the at least one component corresponding to the at least one non-resonant component of the drive signal, and the parameter is one of a stiffness, a mass, and a damping of a conduit (130, 130') of the meter assembly (10).

Preferably, the one or more received sensor signals is comprised of at least one of a right pick-off signal and a left pick-off signal, and the parameter is associated with one of the right pick-off signal and the left pick-off signal.

Preferably, the parameter determined from the one or more sensor signals comprises one of a drive gain of the one or more sensor signals and a resonant frequency of the meter assembly.

According to an aspect, a method of cleaning a conduit in a vibratory meter comprises providing a drive signal to a meter assembly, receiving one or more sensor signals from the meter assembly, and determining a parameter of one or more received sensor signals using a processing system. The method also comprises, based on the parameter, at least one of detecting an unclean condition of the meter assembly and placing the processing system into a cleaning mode, and detecting a clean condition of the meter assembly and placing the processing system into a non-cleaning mode.

Preferably, the unclean condition is detected if a value of the parameter substantially deviates from a baseline value of the parameter, and the clean condition is detected if the value of the parameter substantially equals the baseline value of the parameter. The baseline value is associated with a previously determined clean condition of the vibratory meter.

Preferably, the cleaning mode comprises a cleaning routine comprising iteratively and repeatedly determining a value of the parameter of the received one or more pick-off signals, comparing the value of the parameter to a baseline value of the parameter, and detecting the unclean condition based on the comparison.

Preferably, the method further comprises detecting the clean condition of the meter assembly while in the cleaning mode, and, if the clean condition is detected, entering into a non-cleaning mode.

Preferably, placing the processing system into the cleaning mode comprises the processing system sending a signal over path indicating the cleaning mode of the processing system.

Preferably, the drive signal comprises a resonant component and at least one non-resonant component, the one or more sensor signals comprises at least one component, the at least one component corresponding to the at least one non-resonant component of the drive signal, the parameter is determined from the at least one non-resonant component of the drive signal and the at least one component corresponding to the at least one non-resonant component of the drive signal, and the parameter is one of a stiffness, a mass, and a damping of a conduit of the meter assembly.

Preferably, the one or more received sensor signals is comprised of at least one of a right pick-off signal and a left pick-off signal, and the parameter is associated with one of the right pick-off signal and the left pick-off signal.

Preferably, the parameter determined from the one or more sensor signals comprises a drive gain of the one or more sensor signals and a resonant frequency of the meter assembly.

BRIEF DESCRIPTION OF THE DRAWINGS

The same reference number represents the same element on all drawings. It should be understood that the drawings are not necessarily to scale.

DETAILED DESCRIPTION

FIGS. 1-5 and the following description depict specific examples to teach those skilled in the art how to make and use the best mode of embodiments of cleaning and detecting a clean condition in a vibratory meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of cleaning and detecting the clean condition of the vibratory meter. As a result, the embodiments described below are not limited to the specific examples described below, but only by the claims and their equivalents.

Figure 1:
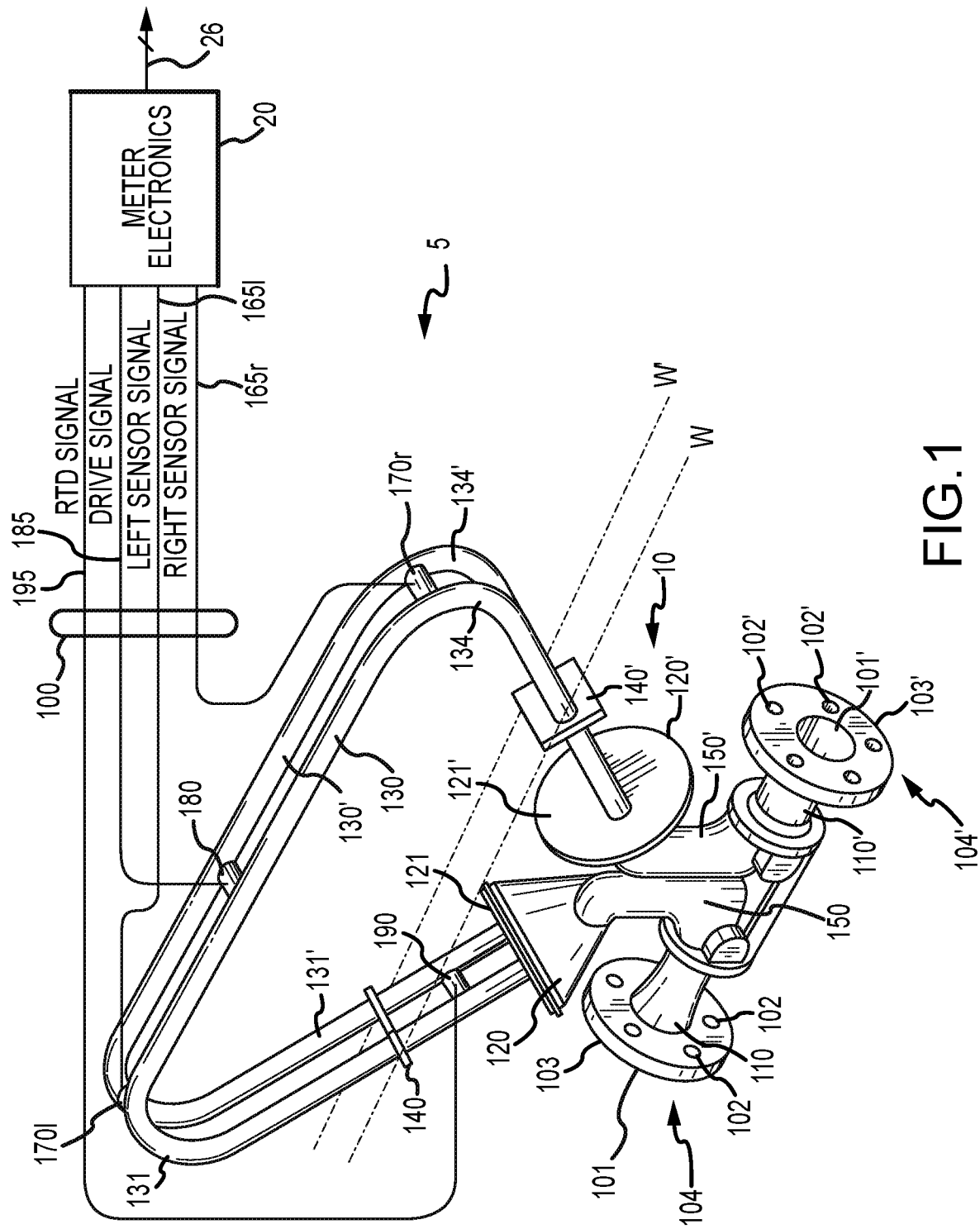
FIG. 1 shows a vibratory meter 5.

FIG. 1 shows a vibratory meter 5. As shown in FIG. 1, the vibratory meter 5 comprises a meter assembly 10 and meter electronics 20. The meter assembly 10 responds to mass flow rate and density of a process material. The meter electronics 20 is connected to the meter assembly 10 via sensor signals 100 to provide density, mass flow rate, temperature information over path 26, and/or other information.

The meter assembly 10 includes a pair of manifolds 150 and 150', flanges 103 and 103' having flange necks 110 and 110', a pair of parallel conduits 130 and 130', driver 180, resistive temperature detector (RTD) 190, and a pair of pick-off sensors 170l and 170r. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through meter assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by lead 195.

Both of the conduits 130, 130' are driven by driver 180 in opposite directions about their respective bending axes W and W' and at what is termed the first out-of-phase bending mode of the flow meter. This driver 180 may comprise any one of many well-known arrangements, such as a magnet mounted to the conduit 130' and an opposing coil mounted to the conduit 130 and through which an alternating current is passed for vibrating both conduits 130, 130'. A suitable drive signal is applied by the meter electronics 20, via lead 185, to the driver 180.

The meter electronics 20 receives the RTD temperature signal on lead 195, and the left and right sensor signals appearing on sensor signals 100 carrying the left and right sensor signals 165l, 165r, respectively. The meter electronics 20 produces the drive signal appearing on lead 185 to driver 180 and vibrate conduits 130, 130'. The meter electronics 20 processes the left and right sensor signals and the RTD signal to compute the mass flow rate and the density of the material passing through meter assembly 10. This information, along with other information, is applied by meter electronics 20 over path 26 as a signal.

A mass flow rate measurement $\dot{m}$ can be generated according to the equation:

$$\dot{m} = FCF[\Delta t - \Delta t_0] \quad [1]$$

The $\Delta t$ term comprises an operationally-derived (i.e., measured) time delay value comprising the time delay existing between the pick-off sensor signals, such as where the time delay is due to Coriolis effects related to mass flow rate through the vibratory meter 5. The measured $\Delta t$ term ultimately determines the mass flow rate of the flow material as it flows through the vibratory meter 5. The $\Delta t_0$ term comprises a time delay at zero flow calibration constant. The $\Delta t_0$ term is typically determined at the factory and programmed into the vibratory meter 5. The time delay at zero flow $\Delta t_0$ term will not change, even where flow conditions are changing. The flow calibration factor FCF is proportional to the stiffness of the flow meter.

It is a problem that the conduits may change with time, wherein an initial factory calibration may change over time as the conduits 130, 130' are corroded, eroded, or otherwise changed. As a consequence, the conduits' 130, 130' stiffness may change from an initial representative stiffness value (or original measured stiffness value) over the life of the vibratory meter 5. Meter verification can detect such changes in the conduits' 130, 130' stiffness, as is explained below.

Figure 2:
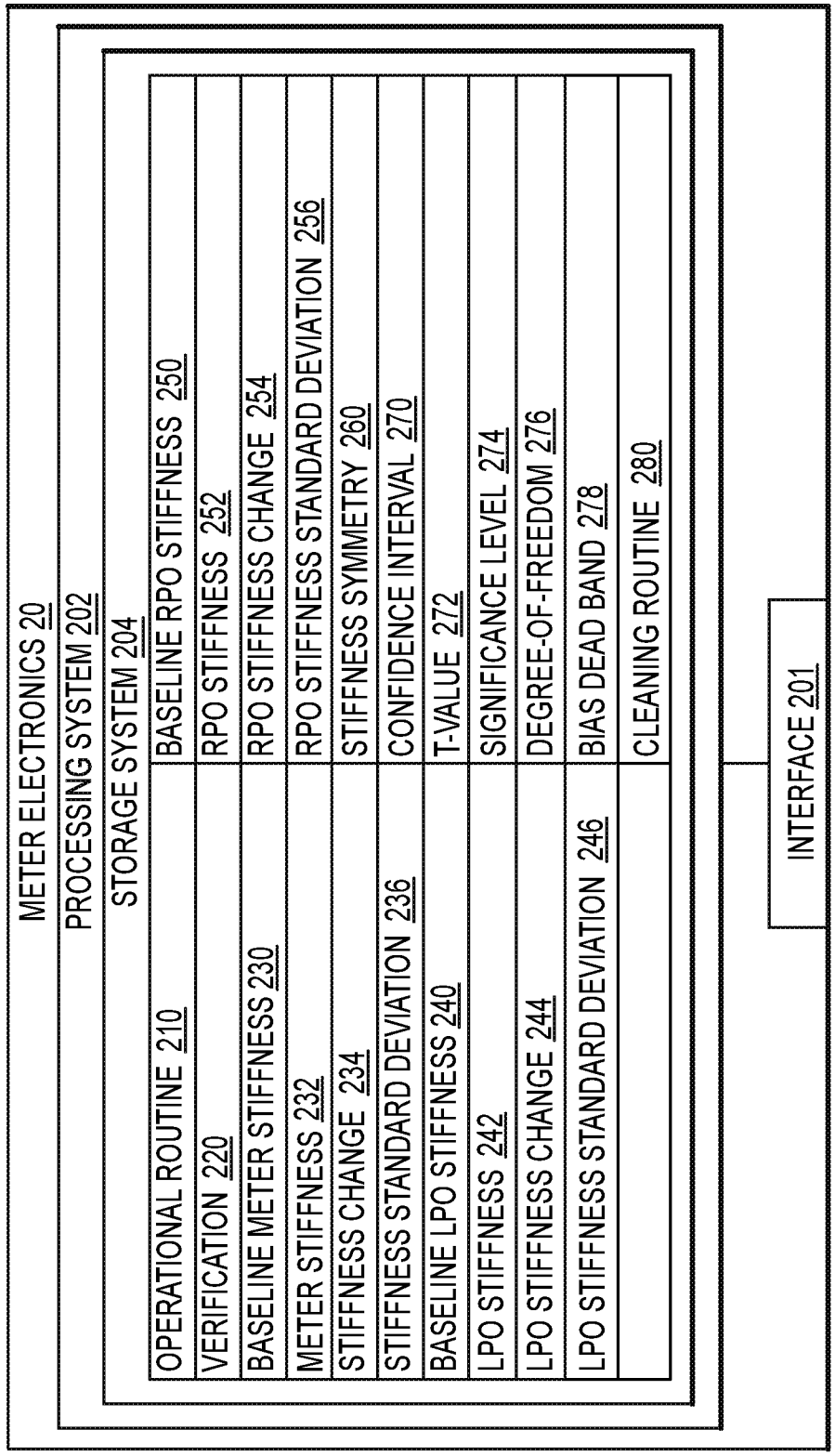
FIG. 2 shows the meter electronics 20 for cleaning and detecting a clean condition in a vibratory meter.

FIG. 2 shows the meter electronics 20 for cleaning and detecting a clean condition in a vibratory meter. The meter electronics 20 can include an interface 201 and a processing system 202. The meter electronics 20 receives a vibrational response, such as from the meter assembly 10, for example. The meter electronics 20 processes the vibrational response in order to obtain flow characteristics of the flow material flowing through the meter assembly 10.

As previously discussed, the flow calibration factor FCF reflects the material properties and cross-sectional properties of the flow tube. A mass flow rate of flow material flowing through the flow meter is determined by multiplying a measured time delay (or phase difference/frequency) by the flow calibration factor FCF. The flow calibration factor FCF can be related to a stiffness characteristic of the meter assembly. If the stiffness characteristic of the meter assembly changes, then the flow calibration factor FCF will also change. Changes in the stiffness of the flow meter therefore will affect the accuracy of the flow measurements generated by the flow meter.

The interface 201 receives the vibrational response from one of the pick-off sensors 170l, 170r via the sensor signals 100 of FIG. 1. The interface 201 can perform any necessary or desired signal conditioning, such as any manner of formatting, amplification, buffering, etc. Alternatively, some or all of the signal conditioning can be performed in the processing system 202. In addition, the interface 201 can enable communications between the meter electronics 20 and external devices. The interface 201 can be capable of any manner of electronic, optical, or wireless communication. The interface 201 can provide information based on the vibrational response.

The interface 201 in one embodiment is coupled with a digitizer (not shown), wherein the sensor signal comprises an analog sensor signal. The digitizer samples and digitizes an analog vibrational response and produces the digital vibrational response.

The processing system 202 conducts operations of the meter electronics 20 and processes flow measurements from the meter assembly 10. The processing system 202 executes one or more processing routines and thereby processes the flow measurements in order to produce one or more flow characteristics. The processing system 202 is communicatively coupled to and is configured to receive the information from the interface 201.

The processing system 202 can comprise a general purpose computer, a micro-processing system, a logic circuit, or some other general purpose or customized processing device. Additionally or alternatively, the processing system 202 can be distributed among multiple processing devices. The processing system 202 can also include any manner of integral or independent electronic storage medium, such as the storage system 204.

The storage system 204 can store parameters, such as meter verification parameters, and data, software routines, constant values, and variable values. The stored values may be measured values, baseline value, or the like. The baseline values may be a value determined prior to the measured value, such as during a factory calibration routine, or the like. However, any suitable baseline value may be employed. In one embodiment, the storage system 204 includes routines that are executed by the processing system 202, such as the operational routine 210 and verification 220 of the vibratory meter 5. The verification 220 of the vibratory meter 5 may include comparing the measured value with the baseline value. The verification 220 may detect a clean and/or an unclean condition of a conduit in the vibratory meter 5. The storage system can also store statistical values, such as a standard deviation, confidence intervals, or the like.

As discussed above, the verification 220 may include comparing the measured value of a parameter and the baseline value of the parameter. For example, if the measured value substantially deviates from the baseline value then a fault condition, such as an unclean condition in the vibratory meter, may be detected. If the measured value substantially equals the baseline value of the parameter, then a non-fault condition, such as a clean condition, may be detected. If the baseline value is associated with a previously determined clean condition, then the detected fault condition may be an unclean condition and the detected non-fault condition may be a clean condition. The parameter may be anything that can be used during the verification 220.

For example, additional or alternative to the parameters shown in FIG. 2, the parameter may be a drive gain employed during the verification 220. The drive gain measures the amount of voltage needed to vibrate one or more conduits to a desired amplitude so as to accurately measure a Coriolis force. A "clean" vibratory meter may have a stable and relatively low drive gain value when operating (e.g., under 10%). A coating of the tubes may create an imbalance that requires more voltage, or drive gain, to maintain the desired amplitude. Once a meter has been properly cleaned the drive gain may return to the stabilized and pre-coated value. The verification 220 may or may not employ a baseline drive gain and a measured drive gain alone or with other parameters, such as, for example, those shown in FIG. 2, which are discussed in more detail in the following.

The storage system 204 can store a baseline meter stiffness 230. The baseline meter stiffness 230 may be determined during manufacturing or calibration of the vibratory meter 5, or during a prior recalibration. For example, the baseline meter stiffness 230 can be determined by the verification 220 before the vibratory meter 5 is installed in the field. The baseline meter stiffness 230 is representative of the stiffness of the conduits 130, 130' before any changes have occurred, such as erosion/corrosion, damage (e.g., freezing, over-pressurization, etc.), coatings, etc. The baseline meter stiffness 230 may be a mean of a plurality of baseline meter stiffness measurements. As such, the baseline meter stiffness 230 may have an associated dispersion characteristic, as will be discussed in more detail below, where the baseline meter stiffness measurements may vary. The more the baseline meter stiffness measurements vary, the greater the dispersion.

The storage system 204 can store a meter stiffness 232. The meter stiffness 232 comprises a stiffness value that is determined from vibrational responses generated during operation of the vibratory meter 5. The meter stiffness 232 may be generated in order to verify proper operation of the vibratory meter 5. The meter stiffness 232 may be generated for a verification process, wherein the meter stiffness 232 serves the purpose of verifying proper and accurate operation of the vibratory meter 5. Similar to the baseline meter stiffness 230, the meter stiffness 232 may be a mean of a plurality of meter stiffness measurements. As such, the meter stiffness 232 may have an associated dispersion characteristic, where the meter stiffness measurements may vary. The more the meter stiffness measurements vary, the greater the dispersion characteristic.

The storage system 204 can store a stiffness change 234. The stiffness change 234 can be a value that is determined by comparing the baseline meter stiffness 230 and the meter stiffness 232. For example, the stiffness change 234 can be a difference between the baseline meter stiffness 230 and the meter stiffness 232. In this example, a negative number may indicate that the stiffness of the conduits 130, 130' increased since being installed in the field. A positive number may indicate that the physical stiffness of the conduits 130, 130' decreased since the baseline meter stiffness 230 was determined.

As can be appreciated, the comparison may be performed in various ways. For example, the stiffness change 234 may be a difference between the meter stiffness 232 and the baseline meter stiffness 230. Accordingly, an increase in stiffness will result in a positive number and a decrease in stiffness will result in a negative number. Additionally or alternatively, values derived from or related to the baseline meter stiffness 230 and/or the meter stiffness 232 can be employed, such as ratios that employ other values, such as conduit geometry, dimensions, or the like.

If the meter stiffness 232 is substantially the same as the baseline meter stiffness 230, then it can be determined that the vibratory meter 5, or more specifically, the conduits 130, 130', may be relatively unchanged from when it was manufactured, calibrated, or when the vibratory meter 5 was last re-calibrated. Alternatively, where the meter stiffness 232 significantly differs from the baseline meter stiffness 230, then it can be determined that the conduits 130, 130' have degraded and may not be operating accurately and reliably, such as where the conduits 130, 130' have changed due to erosion, corrosion, damage (e.g., freezing, over-pressurization, etc.), coating, or other condition.

As discussed above, the baseline meter stiffness 230 and the meter stiffness 232 are determined for both the left and right pick-off sensors 170*l*, 170*r*. That is, the baseline meter stiffness 230 and the meter stiffness 232 are proportional to the stiffness of the conduits 130, 130' between the left and right pick-off sensors 170*l*, 170*r*. As a result, different conditions of the conduits 130, 130' can cause similar stiffness changes 234. For example, erosion, corrosion, and/or damage to the conduits 130, 130' can result in similar decreases in physical stiffness, which may be indicated by a negative or "low" stiffness change 234. Accordingly, when only relying on the stiffness change 234, the specific condition of the conduits 130, 130' may not be ascertainable.

However, the left pick-off sensor 170*l* and the right pick-off sensor 170*r* can each have their own associated stiffness value. More specifically, as discussed above, the driver 180 applies a force to the conduits 130, 130' and the pick-off sensors 170*l*, 170*r* measure a resulting deflection. The amount of deflection of the conduits 130, 130' at the location of the pick-off sensors 170*l*, 170*r* is proportional to the stiffness of the conduits 130, 130' between the driver 180 and the pick-off sensors 170*l*, 170*r*.

Accordingly, the stiffness associated with the left pick-off sensor 170*l* is proportional to the physical stiffness of the conduits 130, 130' between the driver 180 and the left pick-off sensor 170*l* and the stiffness associated with the right pick-off sensor 170*r* is proportional to the physical stiffness of the conduits 130, 130' between the driver 180 and the right pick-off sensor 170r. Therefore, if there is erosion, corrosion, damage, coating, or the like, between the driver 180 and, for example, the right pick-off sensor 170r, then the stiffness associated with the right pick-off sensor 170r may decrease whereas the stiffness associated with the left pick-off sensor 170l may not change. To track the changes, the storage system 204 may also include stiffness values associated with the left and right pick-off sensors 170l, 170r.

For example, as shown in FIG. 2, the storage system 204 includes a baseline LPO stiffness 240, which is proportional to the physical stiffness of the conduits 130, 130' between the driver 180 and the location of the left pick-off sensor 170l on the conduits 130, 130'. Similarly, the storage system 204 also includes a baseline RPO stiffness 250, which is proportional to the physical stiffness of the conduits 130, 130' between the driver 180 and the location of the right pick-off sensor 170r on the conduits 130, 130'. The baseline LPO and RPO stiffness 240, 250 may be determined by the verification 220 before the vibratory meter 5 is installed in the field, such as, for example, during manufacture or calibration of the vibratory meter 5, or during a prior recalibration.

The storage system 204 also includes an LPO stiffness 242 and an RPO stiffness 252. The LPO stiffness 242 is proportional to the physical stiffness of the conduits 130, 130' between the driver 180 and the location of the left pick-off sensor 170l, but after the baseline LPO stiffness 240 is determined. Similarly, the RPO stiffness 252 is proportional to the physical stiffness of the conduits 130, 130' between the driver 180 and the location of the right pick-off sensor 170r, but after the baseline RPO stiffness 250 is determined.

Also as shown in FIG. 2, the storage system 204 further includes an LPO stiffness change 244 and an RPO stiffness change 254. The LPO and RPO stiffness change 244, 254 are proportional to a difference between the baseline LPO, RPO stiffness 240, 250 and the LPO, RPO stiffness 242, 252. For example, a negative LPO stiffness change 244 may indicate that the physical stiffness of the conduits 130, 130' between the driver 180 and the left pick-off sensor 170l has increased. A positive LPO stiffness change 244 may indicate that the physical stiffness of the conduits 130, 130' between the driver 180 and the left pick-off sensor 170l decreased since the baseline LPO stiffness 240 was determined. Alternatively, the LPO and RPO stiffness change 244, 254 may be a difference between the LPO and RPO stiffness 242, 252 and the baseline LPO and RPO stiffness 240, 250. Accordingly, for example, a positive LPO stiffness change 244 can indicate that the physical stiffness of the conduits 130, 130' between the driver 180 and the left pick-off sensor 170l increased since the baseline LPO stiffness 240 was determined. Although the LPO and RPO stiffness change 244, 254 are described as being determined from a difference, any values derived from or related to the baseline LPO and RPO stiffness 240, 250 and the LPO and RPO stiffness 242, 252 can be employed, such as a ratio of a stiffness value and other values, such as a conduit geometry, dimensions, or the like. The LPO and RPO stiffness change 244, 254 can be expressed in any suitable units, such as whole numbers, ratios, percentages etc.

An increase or decrease in the physical stiffness associated with the left and right pick-off sensors 170l, 170r can indicate an unclean condition of the conduit 130, 130' that is causing the physical stiffness change. For example, a coating of an inner wall of the conduits 130, 130' may increase the physical stiffness of the conduits 130, 130'. In particular, coating, for example, of the inner wall of the conduits 130, 130' between the left pick-off sensor 170l and the driver 180 may cause the physical stiffness of the conduits 130, 130' between the left pick-off sensor 170l and the driver 180 to increase.

Additionally, the relative increase or decrease of the physical stiffness of the conduits 130, 130' between the driver 180 and the left pick-off sensor 170l and the physical stiffness of the conduits 130, 130' between the driver 180 and the right pick-off sensor 170r can further indicate the underlying condition of the conduits 130, 130' causing the physical stiffness change. This relative increase or decrease in the physical stiffness may be indicated by a stiffness symmetry 260 in the storage system 204.

The stiffness symmetry 260 can be any suitable value or values that indicate the relative values of, for example, the LPO stiffness change 244 and the RPO stiffness change 254. For example, the LPO stiffness change 244 and the RPO stiffness change 254 may indicate that the physical stiffness of the conduits 130, 130' associated with the left and right pick-off sensors 170l, 170r both increased, but that, for example, the physical stiffness associated with the left pick-off sensor 170l increased more than the physical stiffness associated with the right pick-off sensor 170r. In one example, the stiffness symmetry 260 can be expressed in percentages and be determined by:

$$SMV_{symmetry}\% = SMV_{Stiffness,LPO}\% - SMV_{Stiffness,RPO}\% \qquad [2]$$

where:
$SMV_{Stiffness,LPO}\%$ is, in this example, the LPO stiffness change 244 expressed in percentage change; and
$SMV_{Stiffness,RPO}\%$ is, in this example, the RPO stiffness change 254 expressed in percentage change.

Although the above discussion pertained to meter stiffness, other meter verification parameters may be employed, additionally or alternatively. For example, a residual flexibility may be compared to a baseline residual flexibility. Residual flexibility can be defined as a portion of a frequency response associated with one vibration mode that is at a resonant frequency of another vibration mode. For example, a frequency response of various vibration modes (e.g., bend, twist, etc.) may be characterized as a frequency response function (e.g., magnitude response relative to frequency). The frequency response function is typically centered at a resonant frequency of a given vibration mode with a sloping decrease in magnitude in proportion to the distance from the resonant frequency. For example, a first order bend mode (e.g., main out-of-phase bend mode) with two nodes located at brace bars, may have a first order bend mode resonant frequency $\omega_1$. A second order bend mode with four nodes may have a second order bend mode resonant frequency $\omega_2$ that is greater than the first order bend mode resonant frequency $\omega_1$. The frequency response function of the second order bend mode can overlap the first order bend mode resonant frequency $\omega_1$. Accordingly, the residual flexibility of the first order bend mode caused by the second order bend mode is the portion of the frequency response function of the second order bend mode that lies at the first order bend mode resonant frequency $\omega_1$. As can be appreciated, when erosion, corrosion, damage, coating, or the like occurs, this residual flexibility value of a given mode may change because the frequency response of each vibration mode will change. Accordingly, the residual flexibility can also be used to identify a change in the vibratory meter.

Damping can also be employed. For example, the meter verification can compare a measured damping value to a baseline damping value. Damping can be useful in detecting coating because damping may not be affected by erosion or corrosion.

Similarly, a mass associated with the left or right pick-off sensors 170l, 170r can be compared to a baseline mass associated with the left or right pick-off sensors 170l, 170r. In one example, an expected mass may be employed. In an example, an expected mass based on the calibrated air and water mass values and the measured or known density of the process fluid may be calculated using the below equation:

$$m_{expected} = m_{factory,air} + \frac{(m_{factory,water} - m_{factory,air})}{(\rho_{water} - \rho_{air})}(\rho_{known} - \rho_{air}); \quad [3]$$

where:
- $m_{expected}$ is the expected mass—the mass that should be measured if change did not occur in the vibratory meter;
- $m_{factory,air}$ is a mass measured where the vibratory meter is filled with air;
- $\rho_{air}$ is a density of air;
- $\rho_{water}$ is a density value of water; and
- $\rho_{known}$ is a density of the material being measured.

The expected mass $m_{expected}$ can be used to calculate a normalized mass deviation expressed as a percent via the following equation:

$$m_{Deviation} = \frac{m_{measured} - m_{expected}}{m_{expected}} * 100; \quad [4]$$

where:
- $m_{measured}$ is a mass measured during meter verification; and
- $m_{Deviation}$ is a mass deviation of the measured mass $m_{measured}$ from the expected mass $m_{expected}$.

As can be appreciated, erosion, corrosion, damage, coating, or the like, can affect the mass of the conduits in the vibratory meter. Accordingly, the expected mass can be used to detect a change in the vibratory meter by comparing a measured mass to the expected mass.

As discussed above, conduit geometries may also be considered when determining the condition of the conduit. For example, U-shaped tubes may be more prone to erosion than corrosion at certain locations in the conduit compared to, for example, a straight tube. Additionally or alternatively, some process/conduit combinations may be more prone to certain conditions. For example, the conduits 130, 130' may be more prone to damage in cryogenic processes that employ nitrogen compared to high temperature processes that employ a corrosive material. Accordingly, the LPO stiffness change 244, RPO stiffness change 254, and stiffness symmetry 260, or the methods that use these values, can include, for example, other values, such as factors related to conduit geometry, construction, dimensions, process variables, etc.

As can also be seen in FIG. 2, the storage system 204 can also store a stiffness standard deviation 236, an LPO stiffness standard deviation 246, and an RPO stiffness standard deviation 256. These values can be determined from the meter stiffness measurements that, for example, comprise the baseline meter stiffness 230 and the meter stiffness 232. For example, the stiffness standard deviation 236 may be a pooled standard deviation. Accordingly, the stiffness standard deviation 236 is a measure of how much the meter stiffness 232 varied, including the meter stiffness measurements that comprise the baseline meter stiffness 230. The LPO stiffness standard deviation 246 and the RPO stiffness standard deviation 256 may also be pooled standard deviations.

Although the example shown in FIG. 2 utilizes stiffness standard deviation, other measures of variation and dispersion in a meter verification parameter data may be employed. For example, a variance may be employed instead of a standard deviation. That is, the stiffness standard deviation 236, LPO stiffness standard deviation 246, and RPO stiffness standard deviation 256 are dispersion values of an exemplary meter verification parameter. Additionally or alternatively, other measures of central tendency can be employed instead of a mean value that may be employed for the baseline meter stiffness 230 and the meter stiffness 232. Accordingly, the baseline meter stiffness 230 and meter stiffness 232 are central tendency values of an exemplary meter verification parameter.

The storage can also store other statistical values, such as a confidence interval 270. As will be explained in more detail below, the confidence interval 270 can be calculated based on a t-value 272, a significance level 274, and a degree-of-freedom 276. The significance level 274 may be a scalar value that is set, for example, by the verification 220. The significance level 274 can be defined as the probability of rejecting a null hypothesis when the hypothesis is actually true (e.g., detecting a change when a change has not occurred in the vibratory meter) and is typically a small value, such as 1% or 0.01. The degree-of-freedom 276 is calculated from the number of samples used to determine, for example, the stiffness standard deviation 236. Also shown is a bias dead band 278, which is a scalar value that may also be set by the verification 220 to ensure that biases in the vibratory meter does not induce false flags.

The confidence interval 270 can detect small changes in the physical stiffness of the vibratory meter 5 while also reducing the number of false alarms compared to, for example, the predetermined limits previously used in meter verification. Additionally, the confidence interval 270 can be calculated using relatively simple mathematical operations, thereby allowing the processing system 202 to employ robust statistical techniques using a verification 220 that employs relatively simple embedded code.

The storage system 204 may also store a cleaning routine 280. The cleaning routine 280 may include various steps, such as, for example, sending a cleaning mode signal via the interface 201 and/or the path 26. The cleaning mode signal may be used by devices external of the meter electronics 20 and/or the vibratory meter 5 to, for example, provide a cleaning solution to the vibratory meter. Additionally or alternatively, the interface 201 may receive a cleaning solution signal that may, for example, signal that a cleaning solution is being provided to the vibratory meter 5. The cleaning solution signal may indicate that the solution is being provided, a composition, including concentration, density, temperature, or the like, of the cleaning solution, and/or other data pertaining to the cleaning solution. Accordingly, the cleaning of the vibratory meter 5 may be fully automated. The cleaning routine may also include performing the verification 220, which can verify a clean and/or an unclean condition of the meter assembly 10, as the following discussion illustrates.

Figure 3:
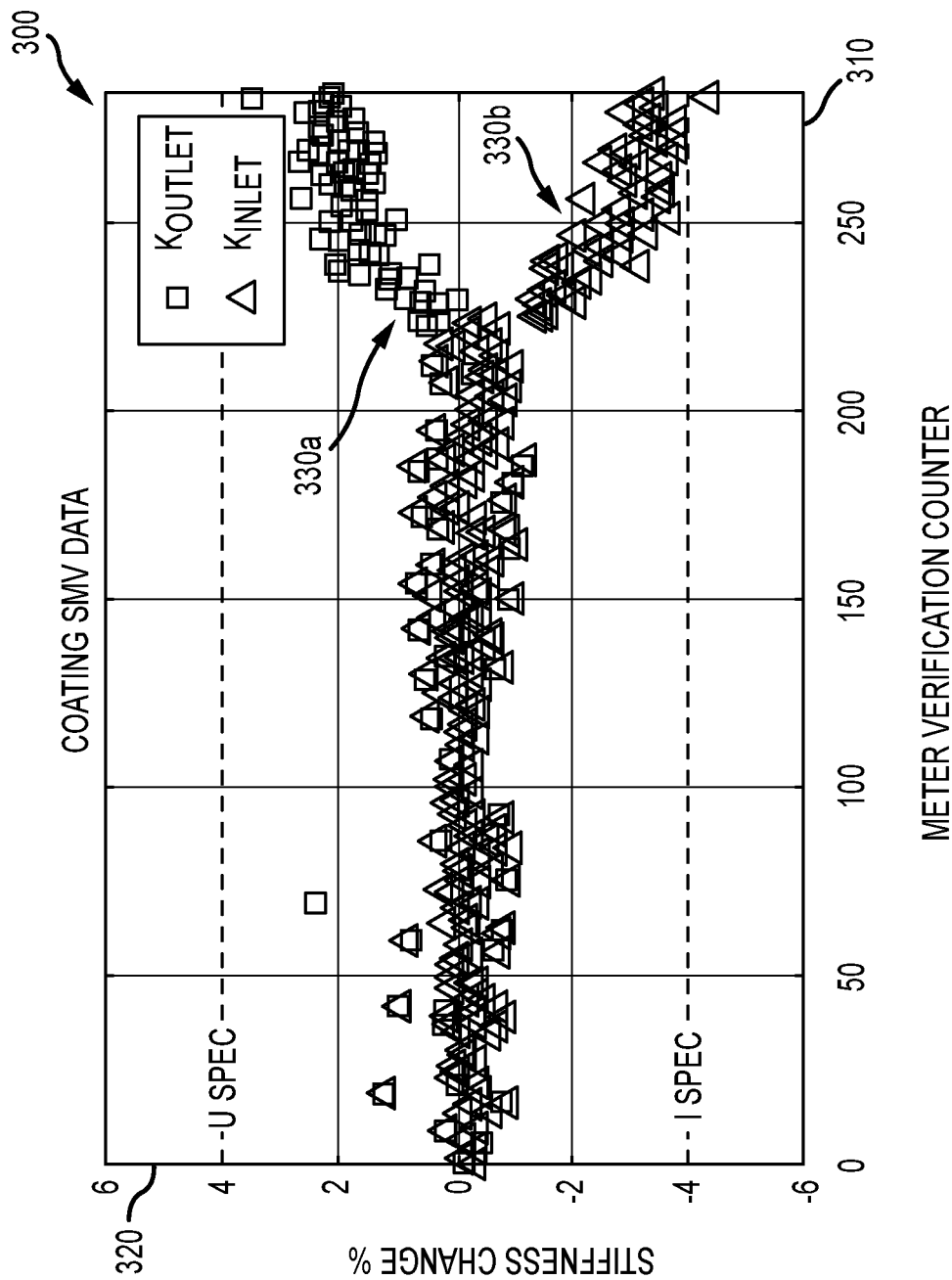
FIG. 3 shows a graph 300 showing a detection of an unclean condition in a vibratory meter.

FIG. 3 shows a graph 300 showing a detection of an unclean condition in a vibratory meter. As shown in FIG. 3, the graph 300 includes a meter verification counter axis 310 and a percent change axis 320. The meter verification counter axis 310 ranges from 0 to about 280 and the percent change axis 320 ranges from about −6% to about 6%. The graph 300 also shows an outlet stiffness plot 330a and an inlet stiffness plot 330b. The outlet and inlet stiffness plots 330a, 330b may respectively be associated with the left pick-off sensor 170l and the right pick-off sensor 170r. Accordingly, the outlet and inlet stiffness plots 330a, 330b may respectively correspond to the LPO stiffness change 244 and the RPO stiffness change 254 described with reference to FIG. 2.

As can be seen in FIG. 3, the outlet and inlet stiffness plots 330a, 330b diverge at a verification count of about 225. As can be appreciated, the outlet stiffness plot 330a increased, indicating that the stiffness around the outlet of the meter assembly 10 may have increased. The inlet stiffness plot 330b decreased, indicating that the stiffness around the inlet of the meter assembly 10 may have decreased. As discussed above, this may be interpreted to mean an unclean condition, such as a coating, may be present in the meter assembly 10. As discussed above, the meter electronics 20 may enter into a cleaning mode where a cleaning routine 280 can perform steps, such as sending a cleaning mode signal, receiving a cleaning solution signal, and/or performing the verification 220.

Figure 4:
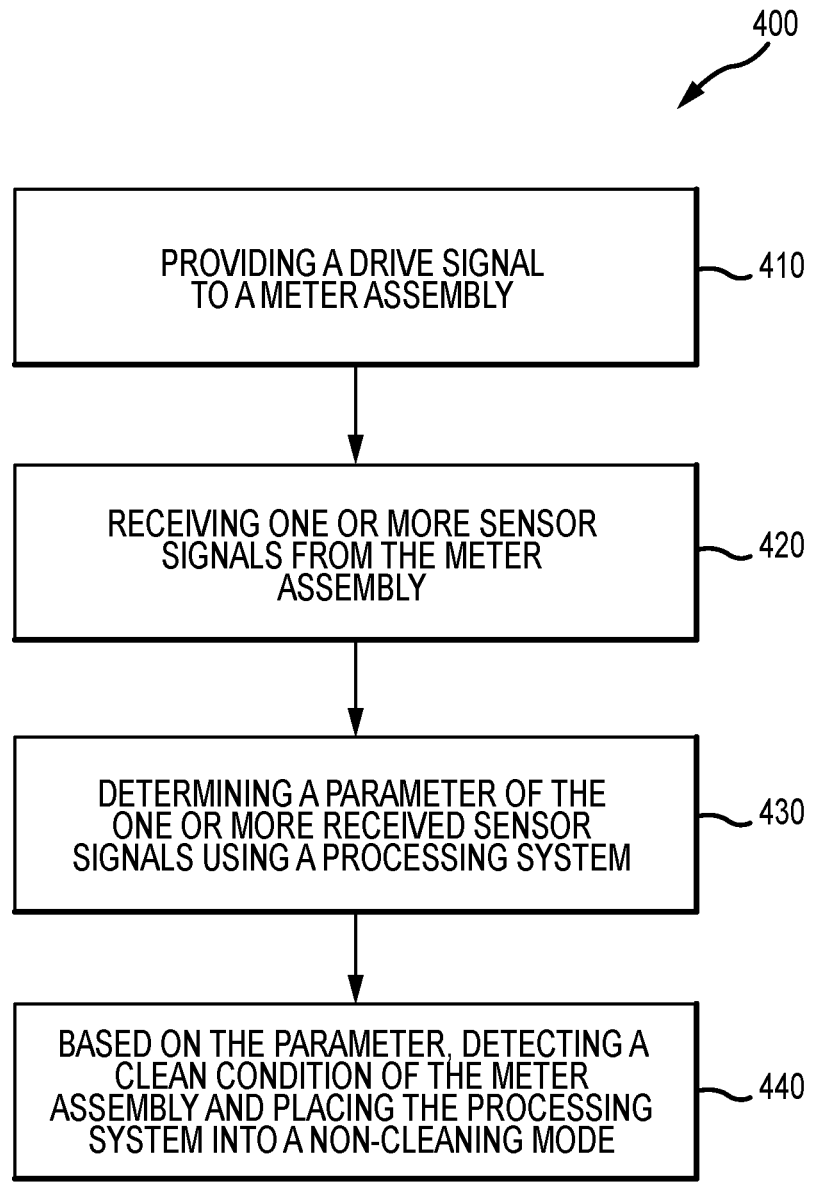
FIG. 4 shows a method 400 of detecting a clean condition in a vibratory meter.

FIG. 4 shows a method 400 of detecting a clean condition in a vibratory meter. As shown in FIG. 4, the method 400 includes providing a drive signal in step 410. The drive signal may be provided, for example, by the meter electronics 20 to the meter assembly 10 shown in FIG. 1. In step 420, the method 400 may receive one or more sensor signals from the meter assembly. The received sensor signals may be the sensor signals 100 described above with reference to FIG. 1. For example, the received sensor signals may include the left and right sensor signals 165l, 165r. In step 430, the method 400 determines a parameter of the one or more received sensor signals using a processing system. The parameter may include the meter stiffness 232, the stiffness change 234, the LPO stiffness 242, the LPO stiffness change 244, the RPO stiffness 252, and/or the RPO stiffness change 254. As can be appreciated, the parameter may also include other values, such as the values shown in FIG. 2. Additionally or alternatively, the parameter may be a drive gain, such as the drive gain described above. In step 440, the method 400, based on the parameter, detects a clean condition of the meter assembly and places the processing system into a non-cleaning mode. The non-cleaning mode may include, for example, executing the operational routine 210 described above with reference to FIG. 2. As can be appreciated, the operational routine 210 may include executing the verification 220 to detect an unclean condition in the meter assembly 10 so as to clean the vibratory meter.

Figure 5:
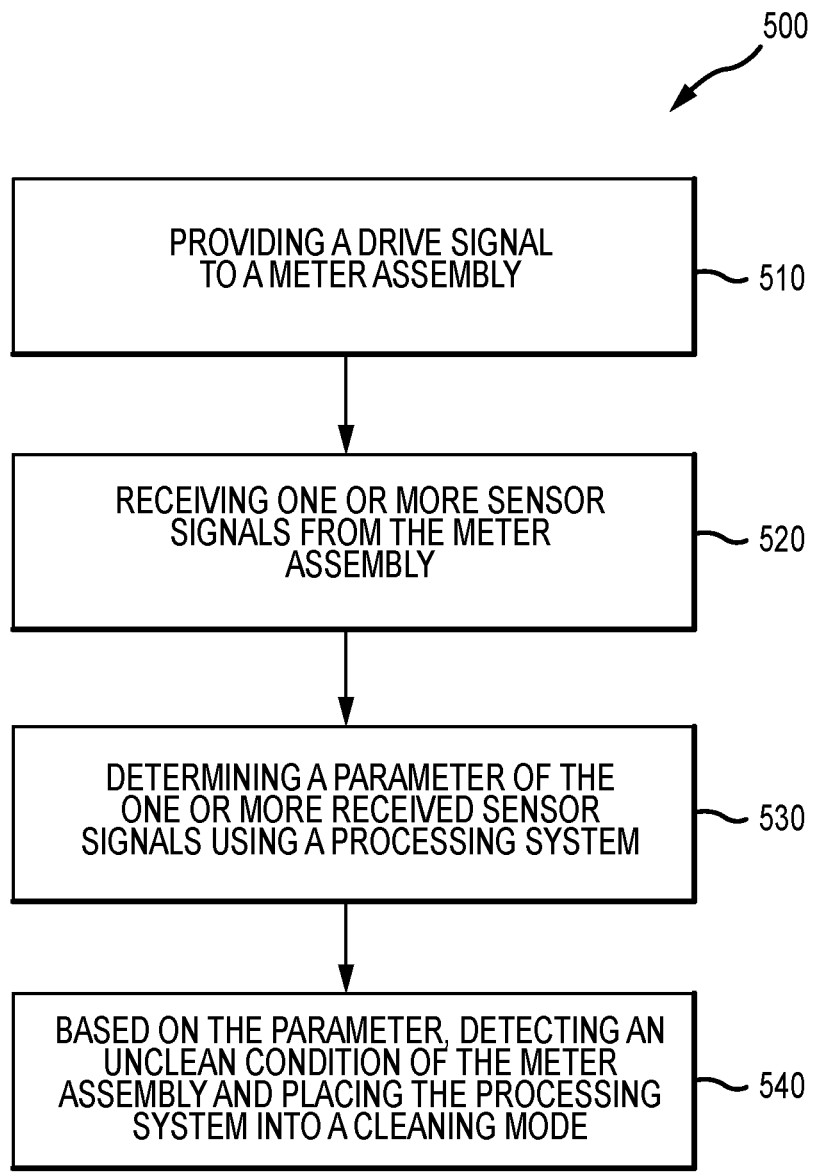
FIG. 5 shows a method 500 of cleaning a vibratory meter.

FIG. 5 shows a method 500 of cleaning a vibratory meter. As shown in FIG. 5, the method 500 provides a drive signal to a meter assembly in step 510. The drive signal may be provided, for example, by the meter electronics 20 to the meter assembly 10 shown in FIG. 1. In step 520, the method 500 may receive one or more sensor signals from the meter assembly. The received sensor signals may be the sensor signals 100 described above with reference to FIG. 1. For example, the received sensor signals may include the left and right sensor signals 165l, 165r. In step 530, the method 500 determines a parameter of the one or more received sensor signals using a processing system. The parameter may include the meter stiffness 232, the stiffness change 234, the LPO stiffness 242, the LPO stiffness change 244, the RPO stiffness 252, and/or the RPO stiffness change 254. As can be appreciated, the parameter may also include other values, such as the values shown in FIG. 2. In step 540, the method 500, based on the parameter, detects an unclean condition of the meter assembly and places the processing system into a cleaning mode. The cleaning mode may include, for example, executing the cleaning routine 280 described above with reference to FIG. 2. As can be appreciated, the cleaning routine 280 may include executing the verification 220 to detect a clean condition in the meter assembly 10.

As can be appreciated, the methods 400, 500 can detect the unclean condition if a value of the parameter substantially deviates from a baseline value of the parameter and/or detect the clean condition if the value of the parameter substantially equals the baseline value of the parameter. As discussed above, the baseline value may be associated with a previously determined clean condition of the vibratory meter. The cleaning mode of the processing system 202 comprises the processing system 202 being configured to execute a cleaning routine. The cleaning routine may comprise iteratively and repeatedly determining a value of the parameter of the received one or more pick-off signals, comparing the value of the parameter to a baseline value of the parameter, and detect the unclean condition based on the comparison.

As can be appreciated, the drive signal may comprise a resonant component and at least one non-resonant component. The one or more sensor signals may comprise at least one component, the at least one component corresponding to the at least one non-resonant component of the drive signal. Accordingly, the parameter may be determined from the at least one non-resonant component of the drive signal and the at least one component corresponding to the at least one non-resonant component of the drive signal. Additionally or alternatively, the parameter determined from the one or more sensor signals may comprise one of a drive gain of the one or more sensor signals and a resonant frequency of the meter assembly. The parameter may, for example, be one of a stiffness, a mass, and a damping of a conduit of the meter assembly, although any suitable parameter may be employed.

The above describes the vibratory meter 5, in particular the meter electronics 20, as being configured to clean and detect a clean condition of the meter assembly 10. Accordingly, the meter electronics 20 or the processing system 202 may enter into a cleaning mode wherein the cleaning routine 280 may, for example, send the cleaning mode signal and/or receive the cleaning solution signal. The cleaning routine 280 may therefore automate some or all of the cleaning of the vibratory meter 5. That is, user interaction and/or intervention with the vibratory meter 5 may be reduced or eliminated, leading to more efficient utilization of the vibratory meter 5 and a system in which the vibratory meter 5 may be employed.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other cleaning and detection of a clean condition of a vibratory meter and not just to the embodiments described above and shown in the accompanying figures. Accordingly, the scope of the embodiments described above should be determined from the following claims.

I claim:

1. A meter electronics (20) configured to automate a cleaning of a conduit in a vibratory meter (5), the meter electronics (20) comprising:
   an interface (201) configured to provide a drive signal to a meter assembly (10) communicatively coupled to the meter electronics (20) and receive one or more sensor signals from the meter assembly (10); and
   a processing system (202) communicatively coupled to the interface (201), the processing system (202) being configured to:
      determine a parameter from the one or more received sensor signals; and
      based on the parameter:
         detect an unclean condition of the meter assembly (10) and enter into a cleaning mode; and
         detect a clean condition of the meter assembly (10) and enter into a non-cleaning mode.

2. The meter electronics (20) of claim 1, wherein the processing system (202) is further configured to:
   detect the unclean condition if a value of the parameter substantially deviates from a baseline value of the parameter; and
   detect the clean condition if the value of the parameter substantially equals the baseline value of the parameter;
   wherein the baseline value is associated with a previously determined clean condition of the vibratory meter (5).

3. The meter electronics (20) of claim 1, wherein the cleaning mode of the processing system (202) comprises the processing system (202) being configured to execute a cleaning routine, the cleaning routine comprising iteratively and repeatedly:
   determining a value of the parameter of the received one or more sensor signals;
   comparing the value of the parameter to a baseline value of the parameter; and
   detecting the unclean condition based on the comparison.

4. The meter electronics (20) of claim 1, wherein the processing system (202) is further configured to:
   detect the clean condition of the meter assembly (10) while the meter electronics (20) is in the cleaning mode; and
   if the clean condition is detected, enter into a non-cleaning mode.

5. The meter electronics (20) of claim 1, wherein the processing system (202) being configured to enter into the cleaning mode comprises the processing system (202) being configured to send a cleaning mode signal over path (26) indicating the cleaning mode of the processing system (202).

6. The meter electronics (20) of claim 1, wherein:
   the drive signal comprises a resonant component and at least one non-resonant component;
   the one or more sensor signals comprises at least one component, the at least one component corresponding to the at least one non-resonant component of the drive signal;
   the parameter is determined from the at least one non-resonant component of the drive signal and the at least one component corresponding to the at least one non-resonant component of the drive signal; and
   the parameter is one of a stiffness, a mass, and a damping of a conduit (130, 130') of the meter assembly (10).

7. The meter electronics (20) of claim 1, wherein the one or more received sensor signals is comprised of at least one of a right pick-off signal and a left pick-off signal, and the parameter is associated with one of the right pick-off signal and the left pick-off signal.

8. The meter electronics (20) of claim 1, wherein the parameter determined from the one or more sensor signals comprises one of a drive gain of the one or more sensor signals and a resonant frequency of the meter assembly.

9. A method of automating a cleaning of a conduit in a vibratory meter, the method comprising:
   providing a drive signal to a meter assembly;
   receiving one or more sensor signals from the meter assembly;
   determining a parameter of one or more received sensor signals using a processing system; and
   based on the parameter:
      detecting an unclean condition of the meter assembly and placing the processing system into a cleaning mode; and
      detecting a clean condition of the meter assembly and placing the processing system into a non-cleaning mode.

10. The method of claim 9, wherein:
    the unclean condition is detected if a value of the parameter substantially deviates from a baseline value of the parameter; and
    the clean condition is detected if the value of the parameter substantially equals the baseline value of the parameter;
    the baseline value being associated with a previously determined clean condition of the vibratory meter.

11. The method of claim 9, wherein the cleaning mode comprises a cleaning routine comprising iteratively and repeatedly:
    determining a value of the parameter of the received one or more sensor signals;
    comparing the value of the parameter to a baseline value of the parameter; and
    detecting the unclean condition based on the comparison.

12. The method of claim 9, further comprising:
    detecting the clean condition of the meter assembly while in the cleaning mode; and
    if the clean condition is detected, entering into a non-cleaning mode.

13. The method of claim 9, wherein placing the processing system into the cleaning mode comprises the processing system sending a cleaning mode signal over a path indicating the cleaning mode of the processing system.

14. The method of claim 9, wherein:
    the drive signal comprises a resonant component and at least one non-resonant component;
    the one or more sensor signals comprises at least one component, the at least one component corresponding to the at least one non-resonant component of the drive signal;
    the parameter is determined from the at least one non-resonant component of the drive signal and the at least one component corresponding to the at least one non-resonant component of the drive signal; and the parameter is one of a stiffness, a mass, and a damping of a conduit of the meter assembly.

15. The method of claim 9, wherein the one or more received sensor signals is comprised of at least one of a right pick-off signal and a left pick-off signal, and the parameter is associated with one of the right pick-off signal and the left pick-off signal.

16. The method of claim 9, wherein the parameter determined from the one or more sensor signals comprises a drive gain of the one or more sensor signals and a resonant frequency of the meter assembly.

* * * * *